US007677048B1

(12) United States Patent
Brostmeyer et al.

(10) Patent No.: US 7,677,048 B1
(45) Date of Patent: Mar. 16, 2010

(54) TURBINE LAST STAGE BLADE WITH FORCED VORTEX DRIVEN COOLING AIR

(75) Inventors: Joseph Brostmeyer, Jupiter, FL (US); Jack W. Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 966 days.

(21) Appl. No.: 11/439,640

(22) Filed: May 24, 2006

(51) Int. Cl.
*F02C 7/12* (2006.01)

(52) U.S. Cl. .......................................... 60/806; 415/115

(58) Field of Classification Search ................... 60/782, 60/785, 806; 415/115–117; 416/96 R, 97 R
See application file for complete search history.

(56) References Cited

U.S. PATENT DOCUMENTS

| | | | | |
|---|---|---|---|---|
| 2,075,648 | A * | 3/1937 | Huttner | 60/669 |
| 2,339,779 | A * | 1/1944 | Holzwarth | 416/96 R |
| 2,906,494 | A * | 9/1959 | McCarty et al. | 416/96 R |
| 3,369,361 | A * | 2/1968 | Gale | 60/39.5 |
| 4,338,780 | A * | 7/1982 | Sakamoto et al. | 60/775 |
| 5,357,742 | A * | 10/1994 | Miller | 60/785 |
| 6,127,758 | A * | 10/2000 | Murry et al. | 310/168 |
| 6,367,242 | B1 * | 4/2002 | Uematsu et al. | 60/39.182 |
| 6,877,324 | B2 * | 4/2005 | Akiyama et al. | 60/806 |
| 2004/0148943 | A1 * | 8/2004 | Laurello et al. | 60/782 |

* cited by examiner

*Primary Examiner*—Michael Cuff
*Assistant Examiner*—Phutthiwat Wongwian
(74) *Attorney, Agent, or Firm*—John Ryznic

(57) ABSTRACT

A gas turbine engine with a turbine section having at least a first stage turbine blade and a last stage turbine blade. The first stage turbine blade includes cooling fluid passages therein in which a compressed cooling fluid, usually from the compressor section of the gas turbine engine, is passed through for cooling of the first stage blade. The last stage turbine blade includes cooling fluid passages therein, but draws the cooling air from an outside ambient pressure source instead of from a compressor. The rotation of the last stage turbine blade and rotor disk provides for a centrifugal force to drive the cooling air into the blade and through the blade for cooling thereof. No additional compression of the last stage cooling fluid is required. A cover plate with a plurality of impellers covers a back side of the last stage rotor disk and provides for an additional means to pump the ambient cooling fluid into the last stage blade.

10 Claims, 1 Drawing Sheet

TURBINE LAST STAGE BLADE WITH FORCED VORTEX DRIVEN COOLING AIR

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to a gas turbine engine, and more specifically to cooling of the turbine blades in the turbine section of the engine.

2. Description of the Related Art Including Information Disclosed Under 37 CFR 1.97 and 1.98

Gas turbine engines include stationary vanes and rotating blades in the turbine section that have cooling fluid passages therein. The cooling fluid is usually air, and the supply for cooling air is usually from the compressor of the gas turbine engine. The first, second, and third stage turbine blades are usually cooled by air supplied from the compressor at various pressures. The cooling air is exhausted to the gas stream from cooling holes in the blades. The first stage blade operates under higher pressures, and therefore requires a cooling fluid supply having such a pressure that the flow can be exhausted into the gas stream. The second and third stage blades also require compressed cooling air in order to exhaust the cooling air into the gas stream. The last stage blade operates under the lowest gas stream pressure, and therefore requires the lowest cooling air pressure of all the stages. Using compressed air supplied from the compressor for the last stage blades waists compressed air and decreases the overall efficiency of the turbine engine.

What is needed is a way to improve the efficiency of the gas turbine engine without requiring as much cooling air from the compressor.

The object of the present invention is to provide for cooling of the last stage blade in a gas turbine engine while also reducing the amount of cooling air bled off from the compressor in order to improve the performance of the gas turbine engine.

The object of the present invention is to reduce the need for cooling air supplied from the compressor and therefore increase the efficiency of the gas turbine engine.

Another object of the present invention is to use the rotation of the fourth stage blade as a pumping means to drive a cooling air from the atmosphere surrounding the turbine through the fourth stage blade for cooling thereof.

BRIEF SUMMARY OF THE INVENTION

The present invention is directed to an industrial gas turbine engine in which the last stage row of blades is cooled by driving cooling air through the blades, where the cooling air is supplied from the ambient air outside of the turbine and pumped through the blade by a centrifugal force (forced vortex flow) applied to the cooling air flow by the rotation of the blade row, or with the aid of an impeller that is secured to a cover plate on the last stage rotor and blade assembly that also rotates with the last stage row of blades. The cover plate includes an impeller on the inside surface, and the cover plate forms a closed space between it and the rear surface of the rotor disc. The cover plate includes cooling air openings to allow the ambient air to flow within the inside space, and the impellers that extend from the cover plate inside the space moves the air through the normal cooling passages within the blade. The cooling air is then exhausted into the gas stream of the turbine engine.

DETAILED DESCRIPTION OF THE INVENTION

A gas turbine engine includes a plurality of stages in the turbine section, each stage including a stationary vane to direct the gas stream onto a stage of rotating blades. It is usual to provide for cooling air passages in the first, second and third stages of the turbine to cool the vanes and blades. The last or fourth stage of the turbine is sometimes not cooled with air passing through the vanes or blades because the gas stream temperature has dropped low enough such that cooling is not needed.

Figure 1:
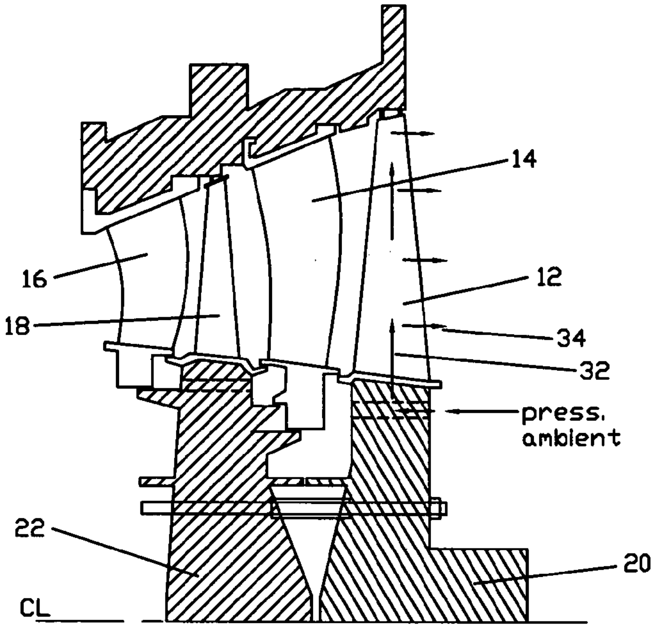
FIG. 1 shows the present invention in which the second-to-last and last stages of the turbine are shown in which the cooling air is forced through the last stage blades by the centrifugal force due to the rotation of the blades.

The gas turbine engine in FIG. 1 shows a first embodiment of the present invention, having a third stage vane 16, a third stage blade 18 secured to a third stage rotor disc 22, a fourth stage vane 14, a fourth stage blade 12 secured to a fourth stage rotor disc 20, and a cooling fluid passage through the blade 12 with an inlet in the blade root. Cooling air through the blade is exhausted to the gas stream at various points along the blade for cooling purposes. The cooling passages through the blade and cooling holes in the blade are not part of the present invention, and can be of any of the well-known arrangements for such to work using the concept of the present invention.

In operation, rotation of the last stage blade forces a cooling air flow through the blade due to centrifugal force. An internal cavity of the blade will act as a forced vortex pump and drive the cooling air from the inlet to the cooling holes in the blade. The centrifugal force due to the rotation of the turbine blade acts as the motive fluid force to pump the cooling air through the blade. The cooling air flow is indicated by the arrows in FIGS. 1 and 2.

Figure 2:
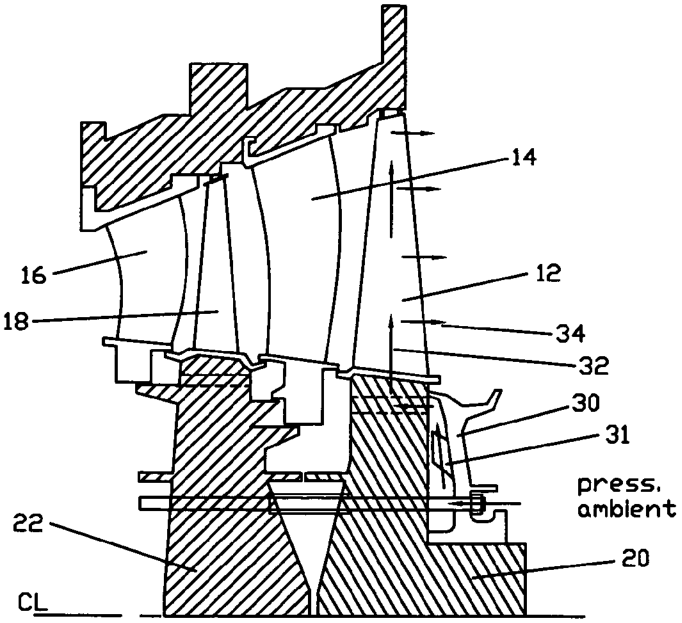
FIG. 2 shows a second embodiment of the present invention in which a cover plate with a row of impellers is added to the rotor of the last stage to increase the pressure of the cooling fluid from the first embodiment.

A second embodiment of the present invention is shown in FIG. 2, which is the first embodiment with the addition of a cover plate 30 having a plurality of impellers 31 inside the cover plate. The cover plate is secured to the rotor disc of the last stage and rotates therewith. Rotation of the cover plate and impellers provide an additional cooling air driving means to increase the pressure of the cooling air and force the cooling air through the blade in addition to the above described centrifugal force for driving the cooling air through the blade. This increase in pressure is in addition to the forced vortex pressure described in the first embodiment.

The cover plate 30 forms a closed space in which a plurality of impellers 31 extend from the inside of the cover plate 30 and into this closed space. A plurality of openings exists in the cover plate 30 to allow for air from outside the turbine to enter the closed space. Rotation of the fourth stage rotor disc 20 drives the air within the closed space through the cooling air passages within the fourth stage blade 12. The cooling air flow path is shown in FIG. 2 by the arrows.

Using the ambient air for cooling the last stage of the turbine, where the cooling air is driven through the blade by the rotation of the blade, or in addition by the use of a cover plate with impellers to increase the pressure of the cooling air being driven through the blade, will eliminate the need for cooling air supplied from the compressor and increase the efficiency of the gas turbine engine.

Cooling air is compressed by the compressor for supply to the first stage turbine blade, while the last stage turbine blade is supplied with uncompressed air from the ambient pressure source outside of the engine. For purposes of this disclosure and the claims, uncompressed air is defined to be cooling fluid that is forced through the last stage turbine blade due to the rotation of the blade and rotor disk. The impellers on the cover plate promote cooling air flow through the blade due to the rotation of the cover plate along with the rotor disk and blade. No outside compressor is used other that the rotor disk and blade assembly to force the cooling fluid through the blade and out the cooling holes.

We claim the following:

1. A gas turbine engine comprising:

a turbine section having a first stage rotor blade and a last stage rotor blade; the first stage rotor blade having an internal cooling air passage; the last stage rotor blade having an internal cooling air passage;

a compressor rotatably connected to the turbine section for producing a compressed air flow; the compressor being connected to the internal cooling air passage of the first stage rotor blade to supply compressed air from the compressor to cool the first stage rotor blade; and, a cover plate rotatably secured to an aft side of the last stage rotor disk and forming a chamber to connect the ambient cooling air source to the internal cooling air passage of the last stage rotor blade such that the ambient cooling air is pressurized by rotating the cover plate.

2. The gas turbine engine of claim 1, and further comprising:

the last stage rotor blade includes blade tip cooling holes connected to the internal cooling air passage to discharge cooling air from the last stage rotor blade.

3. The gas turbine engine of claim 1, and further comprising:

the ambient pressure source for the cooling air for the last stage rotor blade is directly outside of the engine.

4. The gas turbine engine of claim 1, and further comprising:

a motive fluid force for the cooling air flowing through the last stage rotor blade is centrifugal force due to rotation of the last stage rotor blade.

5. The gas turbine engine of claim 1, and further comprising:

a row of impellers rotatably connected to the last stage rotor disk and located within a flow path for the cooling air entering the internal cooling air passage of the last stage rotor blade to increase a pressure of the ambient air entering the last stage rotor disk.

6. The gas turbine engine of claim 5, and further comprising:

the row of impellers is secured to the cover plate and extend into the chamber.

7. A process for cooling a multiple stage turbine of an industrial gas turbine engine, the process comprising the steps of: compressing cooling air in a compressor of the engine;

passing some of the compressed air from the compressor through a row of first stage rotor blades to provide cooling for the first stage rotor blade; and, supplying an uncompressed cooling air from an ambient pressure source outside the engine and into a chamber formed by a cover plate on an aft side of a last stage rotor disk through a row of last stage rotor blades the ambient cooling air is pressurized in the chamber due to rotation of the last stage rotor disk.

8. The process for cooling a multiple stage turbine of claim 6, and further comprising the step of:

discharging the cooling air passing through the last stage rotor blades through a plurality of blade tip cooling holes and into a hot gas stream of the turbine.

9. An industrial gas turbine engine comprising:

a turbine section with multiple rows of turbine rotor blades including a row of last stage rotor blades; the last stage rotor blades extending from a last stage rotor disk; an internal cooling air passage extending through the last stage rotor blades for cooling of the rotor blades; a cover plate rotatably secured to an aft side of the last stage rotor disk and forming a cooling air chamber; the cooling air chamber being connected to the internal cooling air passage of the last stage rotor blades and to ambient air pressure outside of the engine;

a row of impellers secured to the cover plate and extending into the chamber; and, all of the cooling air for the last stage rotor blades is supplied from the ambient pressure source to the chamber and pressurized by rotation of the cover plate and the last stage rotor blades.

10. The industrial gas turbine engine of claim 8, and further comprising:

the internal cooling air passage of the last stage rotor blades is connected to blade tip cooling holes to discharge cooling air and cool the blade tips.

* * * * *

UNITED STATES PATENT AND TRADEMARK OFFICE

CERTIFICATE OF CORRECTION

PATENT NO. : 7,677,048 B1
APPLICATION NO. : 11/439640
DATED : March 16, 2010
INVENTOR(S) : Joseph Brostmeyer et al.

It is certified that error appears in the above-identified patent and that said Letters Patent is hereby corrected as shown below:

column 4, line 25, cancel the text "8. The process for cooling a multiple stage turbine of claim 6, and further comprising the step of:", and insert the following text:

-- 8. The process for cooling a multiple stage turbine of claim 7, and further comprising the step of: -- column 4, line 47, cancel the text "10. The industrial gas turbine engine of claim 8, and further comprising:", and insert the following text:

-- 10. The industrial gas turbine engine of claim 9, and further comprising: --

Signed and Sealed this

Twelfth Day of October, 2010

David J. Kappos

*Director of the United States Patent and Trademark Office*